May 9, 1933.   H. E. FORTUNE   1,908,593
FILLER CAP
Filed March 17, 1932
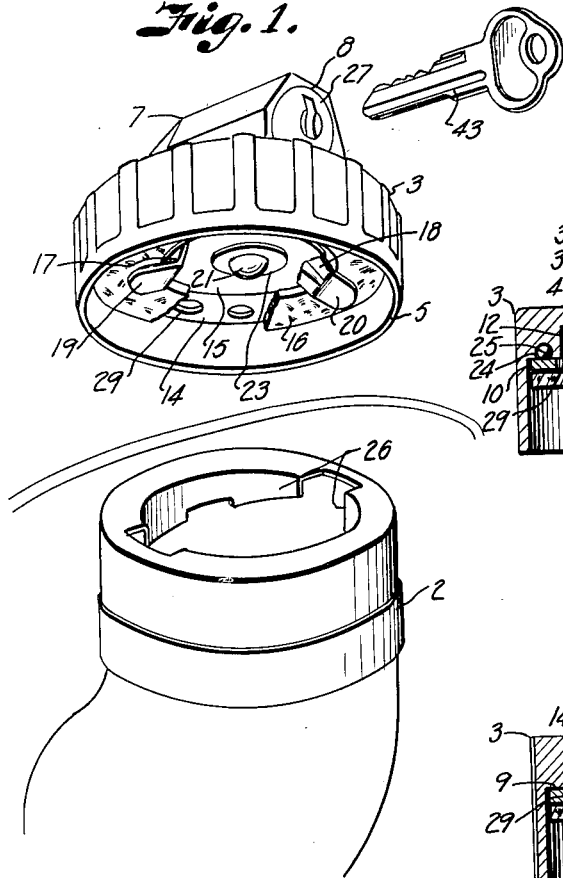
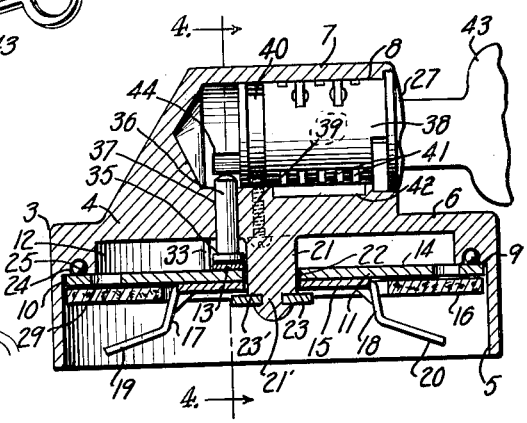
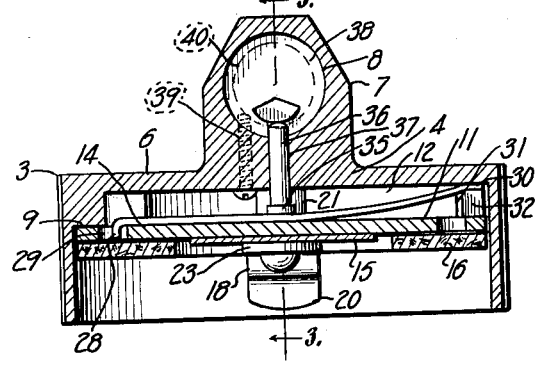
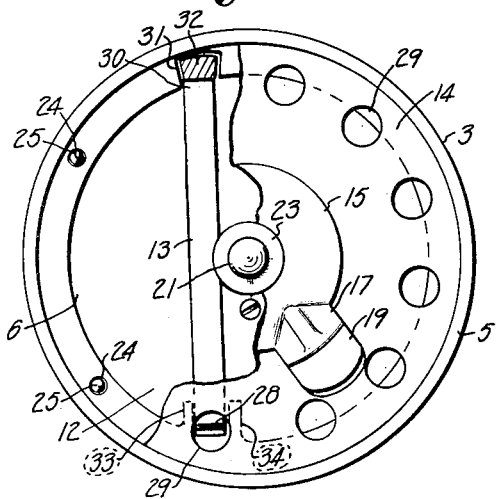
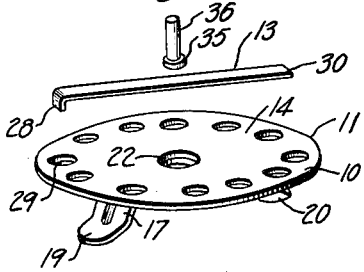
INVENTOR.
Harry E. Fortune
BY
ATTORNEY.

Patented May 9, 1933

1,908,593

UNITED STATES PATENT OFFICE

HARRY E. FORTUNE, OF KANSAS CITY, MISSOURI

FILLER CAP

Application filed March 17, 1932. Serial No. 599,489.

This invention relates to filler caps and more particularly to those of that character adapted for use on automobile fuel tanks, and has for its principal object to prevent unauthorized removal of said caps, thereby preventing theft of fuel when an automobile is parked or placed in storage.

In accomplishing this and other objects of the invention, I have provided improved details of structure, the preferred form of which is shown in the accompanying drawing, wherein:—

Fig. 1 is a perspective view of a cap constructed in accordance with my invention and shown in spaced relation with the filler spout of a fuel tank.

Fig. 2 is a bottom plan view of the cap with its gasket removed, and part of the cap-securing plate broken away to better illustrate the locking member that connects the plate with the cap when the cap is to be removed from the tank with which it is associated.

Fig. 3 is a vertical sectional view through the cap on the line 3—3, Fig. 4, illustrating the lock in elevation.

Fig. 4 is a sectional view on the line 4—4, Fig. 3.

Fig. 5 is a detail perspective view of the cap-retaining member and locking bar, together with the actuating pin therefor, the parts being shown in spaced relation.

Referring more in detail to the drawing:

1 designates an automobile fuel tank having a filler neck 2 closed by a removable cap 3 forming the subject matter of the present invention.

The cap preferably includes a die cast body 4 having a circumferential flange 5 of a suitable diameter to slidably sleeve over the end of the neck 2. The body 4 also includes a top web 6 adapted to seat over the open end of the neck, and is provided on its upper face with a horizontally extending boss 7 having a socket 8 opening laterally of the cap. The inner periphery of the flange 2 adjacent its juncture with the web 6 is provided with an annular, inwardly extending shoulder 9 forming a track for backing the peripheral edge 10 of a locking disk or cap-retaining member 11, and forming a recessed portion 12 for accommodating a locking bar 13 later described.

The cap-retaining member includes a flat disk portion 14 of a diameter to rotate snugly against the inner face of the flange 5 and to seat against the shoulder 9. Preferably spot welded to the under face of the disk 14 concentrically therewith is a circular plate 15 of substantially smaller diameter than the member 14 in order to leave an annular space for accommodating a gasket ring 16. The periphery of the plate 15 is provided at opposite diametrical points with downwardly extending arms 17 and 18 terminating in radially inclined fingers 19 and 20 to clamp the cap upon the filler neck, as later described.

The retaining member thus described is normally freely rotatable upon a boss 21 depending from the inner face of the web 6 directly in the axis of the cap. The retaining member is provided with a central opening 22 through which the end of the boss projects, and is rotatably retained thereon by a washer 23 that is secured against a shoulder 23' formed by a reduced extension 21' of the boss, the end of the extension being peened over the face of the washer as shown in Fig. 3. The longitudinal axial movement of the member is thus limited by means of the shoulder 9 and the washer 23 engaging the opposite faces thereof.

In order to provide substantially free rotation of the retaining member, the shoulder 9 is provided at spaced points about its periphery with sockets 24 mounting ball bearings 25 for engaging against the face of the disk.

It is thus apparent that the retaining member 11 rotates freely within the cap, or that the cap may rotate freely on the retaining member when the fingers 19 and 20 are in engagement with the flanges 26 on the filler neck, as later described.

In order that the retaining member may be selectively locked against rotation relatively to the cap, I provide the lock bar 13 controlled by a key actuated lock 27.

The lock bar 13 includes a flat spring having a hook at one end thereof to form a pawl 28 adapted to engage in any one of a circular series of openings 29 provided in the disk portion of the retaining member adjacent its periphery. The flat end 30 of the spring is anchored within a groove 31 formed in the shoulder portion of the cap, and is retained flat against the bottom face of the web 6 by a pin 32 having its outer end bearing against the disk 14. The lock bar extends across to the opposite side of the shoulder portion of the cap, and is retained against sidewise movement by spaced tongues 33 and 34 extending from the wall of the flange to engage the opposite side of the locking bar and for vertically guiding the pawl 28 thereof to and from engagement with the openings 29.

The locking bar normally lies against the head 35 of a pin 36 and with the pawl thereof out of engagement with the retaining member due to its spring tension, but is adapted to be moved to engage the retaining member when the pin is reciprocated downwardly by the lock, as now described. The pin is slidably mounted in an opening 37 extending through the web of the cap and projects into the socket 8 previously mentioned.

The lock in the present instance includes a cylinder 38 rotatably retained in the socket by a screw 39 projecting through the web of the cap into an annular groove 40 in the cylinder, as best illustrated in Figs. 3 and 4.

The cylinder has a plurality of tumblers 41 normally projected within a groove 42 extending longitudinally of the socket to prevent rotation of the cylinder, but which are retractible therefrom upon insertion of the key 43.

Projecting from the rear end of the cylinder is an arcuate lug 44 adapted to engage the projecting end of the pin 36 to move the pin against tension of the lock bar 13 for projecting the hooked end 28 thereof into one of the openings 29, thereby locking the cap against rotation relative to the retaining member.

To apply a cap constructed and assembled as described, the key 43 is inserted in the lock to retract the tumbler 41 from the recess 42. The cylinder 38 is then rotated by the key to bring the lug 44 into camming engagement with the end of the pin 36 to move the lock bar 13 into latching engagement with the cap-retaining member 11.

The cap and its retaining member are coupled together so that when the cap is applied to the filler neck and rotated, the fingers 19 and 20 will engage under the flanges 26 to tighten the gasket in sealing engagement with the end of the neck. The cylinder is then rotated retractively by the key to move the lug 44 away from the pin 36, after which the tension in the lock bar 13 will effect lifting of the hooked end thereof out of engagement with the retaining member. When the key is removed, the tumblers 41 will drop into their recess 42 to prevent movement of the cylinder.

It is, therefore, apparent that when the cap is applied it is free to rotate upon the retaining member which is clamped to the flanges 26 within the filler neck. It is therefore impossible to move the retaining member from clamped engagement with the filler neck until the key is again inserted in the lock.

To remove the cap the key is inserted in the lock to release the tumblers 41. The cylinder is then rotated by the key to cause its lug 44 to reengage the pin 37 to cam it downwardly against tension of the lock bar. Continued movement of the pin by the cylinder projects the hooked end of the lock bar into one of the openings 29 of the retaining member to rotatably couple the cap therewith. Then upon rotation of the cap the fingers 19 and 20 of the retaining member will be moved from clamping engagement with the flanges 26 and the cap can be removed.

From the foregoing it is apparent that I have provided a filler cap of simple construction which can be economically manufactured and readily installed to prevent theft of fuel from the fuel tank of an automobile.

What I claim and desire to secure by Letters Patent is:

1. A filler cap of the character described, a body member adapted to close over a filler neck of a fuel tank, a retaining member rotatably supported in the body member and adapted to clampingly engage the filler neck, a lock carried by the body member, a lock bar having one end fixed to the body member and a pawl at its opposite end to engage the retaining member, and means operable by said lock to effect movement of the pawl into engagement with said retaining member to lock the retaining member against rotation in said cap.

2. A filler cap of the character described, a body member having a flange adapted to engage over a filler neck of a fuel tank, a retaining member rotatably supported in the body member and adapted to engage the filler neck, a lock bar having one end fixed to the body member and a pawl at its opposite end to engage the retaining member, and means in the body member operable to effect movement of the pawl of said lock bar into engagement with said retaining member to lock the retaining member against rotation in said cap.

3. A filler cap of the character described, a body member having a flange adapted to engage over a filler neck of a fuel tank and having an annular shoulder, a retaining member rotatably engageable with said shoulder, fingers on the retaining member for engaging the filler neck, means on the body member for rotatably securing the retaining member against said shoulder, a lock bar having one end fixed to the body member and having a pawl adapted to engage the retaining member to prevent rotation thereof relative to the body member to cause engagement and disengagement of the fingers when the body member is rotated on the filler neck, and means engaging the lock bar for actuating said pawl.

4. A filler cap of the character described, a body member having a flange adapted to engage over a filler neck of a fuel tank and having an annular shoulder, a retaining member rotatably engageable with said shoulder and adapted to engage the filler neck, means on the body member for rotatably securing the retaining member against said shoulder, a lock bar having one end anchored to the body member and having its opposite end adapted to engage the retaining member to prevent rotation thereof relative to the body member, a pin slidable in the body member to move the lock bar into engagement with said retaining member, and a lock in said body member including a rotatable cylinder having a lug to actuate the pin.

5. A filler cap of the character described, a body member having a flange adapted to engage over a filler neck of a fuel tank and having an annular shoulder, a retaining member rotatably engageable with said shoulder and adapted to engage the filler neck, a boss on the body member for rotatably securing the retaining member against said shoulder, a lock bar having one end anchored to the body member and having its opposite end adapted to engage the retaining member to prevent rotation thereof relative to the body member, a pin slidable in the body member to move the lock bar into engagement with said retaining member, and a lock in said body member including a rotatable cylinder having a lug to actuate the pin.

6. A cap of the character described, a body member having a flange adapted to engage a filler neck of a fuel tank and having an internal annular shoulder, a disk rotatably mounted in the body member having its periphery backed by said shoulder and having an opening therethrough, fingers on said disk for engaging the neck of the fuel tank, a lock bar having one end anchored in the body member and a hook at its opposite end to engage in said opening, a pin slidable in the body member and engageable with said lock bar, means in the body member for guiding the hooked end of the lock bar, a lock cylinder rotatably mounted in the body member, and a lug on the cylinder to engage said pin to move the lock bar in locking engagement with said disk whereby said fingers may be disengaged from the filler neck upon rotation of the body member.

7. A cap of the character described, a body member adapted to engage a filler neck of a fuel tank, a disk rotatably mounted in the body member and having an opening therethrough, fingers on said disk for engaging the neck of the fuel tank, a lock bar having one end anchored in the body member and a hook at its opposite end to engage in said opening of the disk, a pin slidable in the body member and engageable with said lock bar, means in the body member for guiding the hooked end of the lock bar, a lock cylinder rotatably mounted in the body member, and a lug on the cylinder to engage said pin to move the lock bar in locking engagement with said disk whereby said fingers may be disengaged from the filler neck upon rotation of the body member.

8. A cap of the character described, a body member adapted to engage a filler neck of a fuel tank and having an internal annular shoulder, a disk normally rotatable having its periphery backed by said shoulder and having an opening therethrough, fingers on said disk for engaging the neck of the fuel tank, a lock bar having one end anchored in the body member and a hook at its opposite end to engage in said opening, a pin slidable in the body member and engageable with said lock bar, means in the body member for guiding the hooked end of the lock bar, and means mounted in the body member for engaging said pin to move the lock bar in locking engagement with said disk whereby said fingers may be disengaged from the filler neck upon rotation of the body member.

In testimony whereof I affix my signature.

HARRY E. FORTUNE.